United States Patent [19]

Esselborn et al.

[11] Patent Number: 4,618,457

[45] Date of Patent: Oct. 21, 1986

[54] SULFONATED POLYOXYALKYLENE ETHERS OF 1,2 OR 1,3-DIOLS, THEIR PREPARATION AND USE

[75] Inventors: Eberhard Esselborn, Essen; Jürgen Fock, Duesseldorf, both of Fed. Rep. of Germany

[73] Assignee: Th. Goldschmidt AG, Essen, Fed. Rep. of Germany

[21] Appl. No.: 707,056

[22] Filed: Mar. 1, 1985

[30] Foreign Application Priority Data

Mar. 1, 1984 [DE] Fed. Rep. of Germany ....... 3407563

[51] Int. Cl.$^4$ ................. C07C 139/00; C07C 143/02; C08K 5/05
[52] U.S. Cl. ............................ 260/504 R; 260/513 R; 524/381
[58] Field of Search ........................ 260/504 R, 513 R

[56] References Cited

U.S. PATENT DOCUMENTS 3,583,941 6/1971 Trapasso et al. ............... 260/513 R
3,592,796 7/1971 Trapasso et al. ............... 260/513 R
3,879,450 4/1975 Velker ........................... 260/513 R Primary Examiner—Alan Siegel
Attorney, Agent, or Firm—Toren, McGeady, Stanger, Goldberg & Kiel

[57] ABSTRACT

Sulfonated polyoxyalkylene ethers of the formula

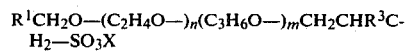

in which $R^1$ is

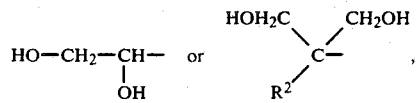

$R^2$ is $CH_3-$, $C_2H_5-$, or $C_3H_7-$, $R^3$ is $H-$ or $CH_3-$, X is $H-$, alkali metal or ammonium ion, n is 0 to 100, m is 0 to 50, and n+m is not less than 1. The compounds are prepared by adding a compound of formula $HSO_3X$ in a known manner by a free radical reaction in the presence of catalysts and optionally at an elevated temperature to compounds of the formula

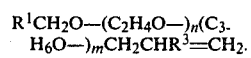

The inventive compounds can be used as the only or a partial polyol component for the preparation of curable, polyurethane-based adhesives and increase the combined tensile and shear strength and the floating roller peel strength of the adhesive bonds.

1 Claim, No Drawings

SULFONATED POLYOXYALKYLENE ETHERS OF 1,2 OR 1,3-DIOLS, THEIR PREPARATION AND USE

BACKGROUND OF THE INVENTION

1. Field of the Invention

The invention relates to sulfonated polyoxyalkylene ethers of 1,2- or 1,3-diols, their preparation and use.

2. Description of the Prior Art

German Offenlegungsschrift No. 30 25 807 describes a process for the preparation of polyethers with retention of at least two free hydroxyl groups on the starter alcohol, the hydroxyl groups being separated from each other by, at most, three carbon atoms and the hydroxyl groups at the ends of the polyether chain being optionally reversibly blocked, yet stable to the conditions of acetal or ketal splitting, wherein (a) an oxirane of formula:

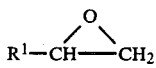

in which $R^1$ represents a hydrogen radical or, optionally, a halogenated hydrocarbon group with 1 to 30 carbon atoms or the $-CH_2OR^2$ group, in which $R^2$ represents an alkyl or alkenyl group, the $R^1$ groups within the polymeric molecule being the same or different, is added by addition reaction to a trihydric or multihydric alcohol, in which at least two hydroxyl groups are acetalized or ketalized;

(b) the hydroxyl group of the polyether monool obtained is blocked by reaction with a monofunctional compound which is reactive with respect to this hydroxyl group and stable to the conditions of acetal or ketal splitting; and (c) the acetal or ketal is then split by the action of an acid.

In accordance with the disclosed process, the blocking of the hydroxyl group of the polyether monool obtained in step (a) can be achieved by reaction with a hydrocarbon halide. If allyl chloride or methallyl chloride is used as the hydrocarbon halide, compounds are obtained having a terminal olefinic double bond, at which further addition reactions can be carried out. Such compounds can be used in many ways. Particularly, such compounds can be used as modifying components in the preparation of polyurethanes or polyesters because of their hydroxyl groups in the 1,2- or 1,3-position of the starter alcohol.

Those compounds which have terminal polar groups are also of great interest, especially those which are stable to hydrolysis.

SUMMARY OF THE INVENTION

We have discovered novel compounds having the above characteristics and having a combination of structural elements which make possible their use as diol components in polyaddition reactions, in which they can be used by themselves or proportionally in addition to other polyols. More particularly, such compounds have the formula $$R^1CH_2O-(C_2H_4O-)_n(C_3H_6O-)_mCH_2CHR^3CH_2-SO_3X$$

in which $R^1$ is

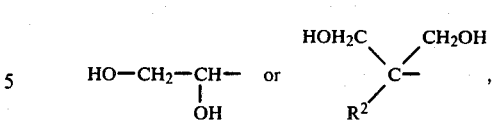

$R^2$ is $CH_3-$, $C_2H_5-$, or $C_3H_7-$,
$R^3$ is $H-$ or $CH_3-$,
X is $H-$, alkali metal or ammonium ion,
n is 0 to 100,
m is 0 to 50, and
n+m is not less than 1.

The compounds are liquid or waxy compounds depending on their oxyethylene and/or oxypropylene content. Their water solubility or water dispersibility is also a function of the oxyethylene or oxypropylene content.

The inventively prepared compounds have three structural elements which determine their properties:

1. The linear macromolecule has two reactive hydroxyl groups at one end which are linked to the starter alcohol and to which alkylene oxide is added by addition reaction;

2. The chain of the macromolecule is formed by oxyethylene and/or oxypropylene units; and 3. The polar $SO_3X$ group, linked directly to carbon, is at the end of the macromolecule opposite to that holding the starter alcohol.

We have also discovered a method for preparing the inventive compounds wherein a compound having the formula $HSO_3X$ is added in a known manner by a free radical reaction in the presence of catalysts and, optionally, at an elevated temperature, to compounds having the formula $$R^1CH_2O-(C_2H_4O-)_n(C_3H_6O-)_mCH_2CHR^3=CH_2.$$

DESCRIPTION OF THE PREFERRED EMBODIMENT

The starting compounds having allyl or methallyl groups are prepared according to the teachings of German Offenlegungsschrift No. 30 25 807. Starting compounds may be glycerin, trimethylolethane, trimethylolpropane or trimethylolbutane. In this process, firstly, two hydroxyl groups of the compounds are converted over a period of time at room temperature and in the presence of a drying agent into the corresponding acetal or ketal groups in an acid catalyzed reaction with an aldehyde, such as, for example, formaldehyde, acetaldehyde, propionaldehyde and butyraldehyde, or with a ketone, such as, for example, acetone, methyl ethyl ketone and methyl isobutyl ketone, so that only one reactive hydroxyl group is retained. This hydroxyl group is reacted by an addition reaction in the presence of a basic catalyst, such as, potassium or sodium methylate, under a pressure of 1 to 6 bar and at temperatures of 90° to 120° C. under nitrogen with ethylene oxide and/or propylene oxide in amounts such that the conditions for the subscripts n and m as well as for the sum of n+m are fulfilled. The polyoxyalkylene ether obtained is reacted under nitrogen at 80° to 120° C., and with removal of the hydrogen gas or the methanol with an alkali metal, such as, sodium or potassium or their alcoholates, such as, sodium or potassium methylate to form the corresponding alkali polyether. The alkali salt is then reacted with allyl or methallyl halide at 70° to 100° C., the alkali halide formed is removed by filtration, and finally, the acetal or ketal is split by the action of an acid, such as, hydrochloric acid, sulfuric acid or phosphoric acid at about 80° C. By such a procedure, the starting material required for the inventive process is obtained.

The preparation of the starting compounds can be represented by the following reaction equations:

Step 1

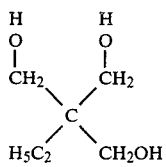 + CH$_3$COCH$_3$ 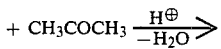

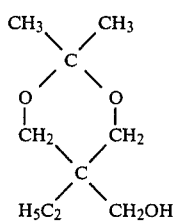 + H$_2$O

Step 2

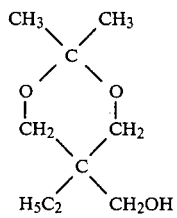 + n H$_2$C—CH$_2$ 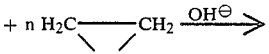
   \\_O_/

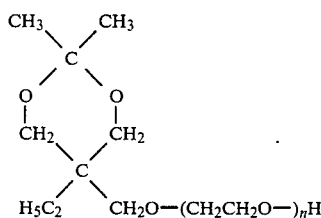

Step 3

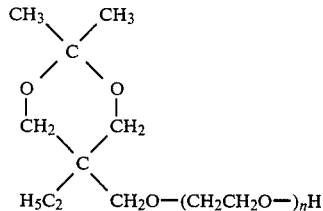 + Na$^\oplus$OCH$_3^\ominus$ 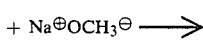

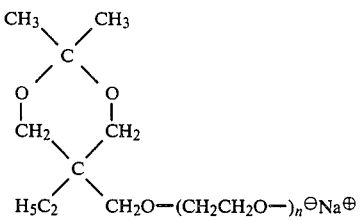 + CH$_3$OH

Step 4

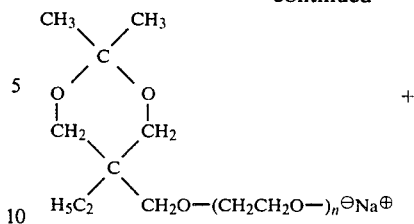 +

CH$_2$=CHCH$_2$Cl 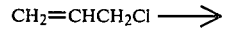

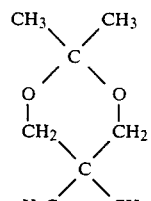 + NaCl

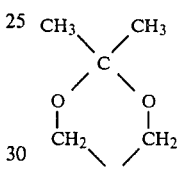

Step 5

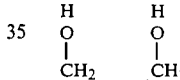 + H$_2$O 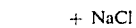

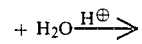 + CH$_3$COCH$_3$

The reaction of this allyl and/or methallyl derivative with a compound having the formula HSO$_3$X is accomplished in a known manner. The addition reaction is described, for example, in Houben-Weyl "Methoden der organischen Chemie" (Methods of Organic Chemistry)., Vol. IX, page 380. Preferably, ammonium hydrogen sulfite is used. The radical addition proceeds in high yield in the presence of atmospheric oxygen and, if necessary, at moderately elevated temperatures up to 40° C. The addition reaction can be followed by the decrease in the concentration of double bonds as reflected in the iodine number, as well as by means of the elementary sulfur determination by the Carius method. The inventive process therefore proceeds according to the following reaction outline:

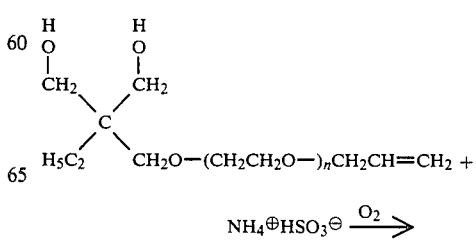 +

NH$_4^\oplus$HSO$_3^\ominus$ $\xrightarrow{O_2}$

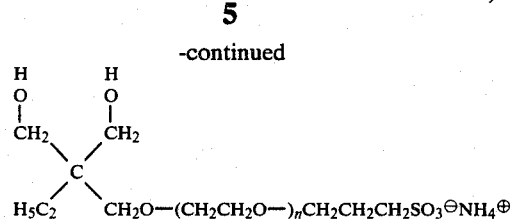

Sulfurous acid or an acidic alkali salt of sulfurous acid, especially sodium hydrogen sulfite, may also be used instead of ammonium hydrogen sulfite. Metal hydrogen sulfites, other than the alkali salts, are also usable, but generally are not employed because of their low solubility.

Because of their structure elements, the inventive compounds are particularly suitable for the preparation of modification of polyesters or polyurethanes. The properties of the polymeric polyaddition products, especially the properties of the surfaces, are affected in a desirable manner by these compounds. For example, it has surprisingly turned out that the adhesive properties of curable polyurethane-based adhesives are improved considerably, if the inventive compounds are used as the only polyol components or as a part of the polyol components. Moreover the combined shear and tensile strength and the floating roller peel strength of bonded sheets of aluminum are significantly improved.

The preparation of the inventive compounds, as well as the technical effects achievable through the use of the inventive compounds are described in greater detail in the following example.

EXAMPLE

(A) Preparation of a 1,3-Polyetherdiol (not in accordance with the invention)

Potassium methylate (7 g) is dissolved at 80° C. in 174 g (approximately 1 mole) of 2,2-dimethyl-5-ethyl-hydroxymethyl-1,3-dioxane in a reactor equipped for forced circulation. After it is carefully flushed with pure nitrogen, the reactor is heated to 110° C. and a mixture of 440 g (approximately 10 moles) of ethylene oxide and 440 g (approximately 7.6 moles) of propylene oxide is added at a rate, such that the internal temperature of the reactor does not exceed 120° C. and the pressure 3 bar. After all of the alkylene oxide has been passed into the reactor, the temperature is maintained at 120° C. until a constant pressure indicates the end of the reaction. Residual monomers are then removed under vacuum at 80° to 90° C.

After the reaction is completed, 50 ml of water are stirred into the product at 80° C. Subsequently, 30 g of a 30% phosphoric acid solution are added and the product is stirred for 0.25 hours and then adjusted to pH 7 with $NaH_2PO_4$. The water is then distilled off at 80° to 90° C. in a vacuum of 10 torr and the product is filtered using 10 g of a silicate based filter aid.

The hydroxyl number of the product obtained is 58.4 which corresponds to a molecular weight of about 960.

To 960 g (approximately 1 mole) of the polyether obtained, which has been carefully dried once again, 24.2 g (approximately 1.05 moles) of sodium metal are added in small portions at 120° C. under stream of nitrogen. At the end of this addition, heating is continued for a further 2 hours. The product is then cooled to about 50° C. and 80.3 g (approximately 1.05 moles) of allyl chloride are added dropwise over a period of ½ hour. The temperature is then raised once again to 120° C.

The precipitated salt is filtered off after addition of a filter aid.

From the iodine number, determined by the method of Hanus, the conversion of the condensation reaction is estimated to be 98.8% and the hydroxyl number is 1.4.

The ketal ring of the polyether is split by heating the polyether, mixed with 1N hydrochloric acid and ethanol in a weight ratio of 1:1:1, for 8 hours under reflux. At the end of the splitting reaction, the reaction mixture while still hot, is neutralized with 50% aqueous sodium hydroxide. All volatile components are subsequently distilled off at a temperature between 70° and 80° C. and a vacuum of 10 torr. Again, the salt produced is removed completely by filtering hot using a filter aid.

The hydroxyl number of the polyether obtained is 109.

(B) Preparation of a Sulfonated 1,3-Polyetherdiol (in accordance with the invention)

The product obtained in (A) (960 g, approximately 1 mole) is dissolved in 1,000 ml of a mixture of 5 parts by weight of water and 1 part by weight of ethanol. A solution of 149 g (approximately 1.5 moles) of ammonium hydrogen sulfite in 300 ml of water, as well as 50 ml of a 25% aqueous solution of ammonia are added with vigorous stirring in the presence of air over a period of 2 hours. After allowing the reaction to continue for a further 2 hours, the water and ethanol are removed at a temperature of 60° to 80° C. and a vacuum of 10 torr and the precipitated excess ammonium hydrogen sulfite is filtered off with the help of a filter aid.

The reaction yield, calculated from the iodine number of the product obtained, is 89.5%. The reaction yield, calculated from the total sulfur value as determined by the Carius method is 91.5%.

The hydroxyl number obtained after the ammonium sulfonate was converted into the corresponding sodium sulfonate, is 101.

(C) Preparation of a Polyurethane-Based Adhesive Using the Sulfonated 1,3-Polyetherdiol and Testing the Product A polyurethane-based adhesive is prepared from a polyol component of the following composition:
23 parts by weight of sulfonated 1,3-polyetherdiol as prepared in Section B;
17 parts by weight of a hydroxy-functional polyacrylate;
2 parts by weight of a propoxylated bisphenol A.

The hydroxy-functional polyacrylate is obtained by copolymerizing 80 g (approximately 0.63 moles) of n-butyl acrylate, 15 g (approximately 0.17 moles) of vinyl acetate and 5 g (approximately 0.04 moles) of 2-hydroxyethyl acrylate in the presence of 2.2 g (approximately 0.03 moles) of 2-mercaptoethanol and 0.3 g of azobisisobutyronitrile, as described in German Offenlegungsschrift No. 30 47 926.

The propoxylated bisphenol A is obtained by alkoxylating 228 g (approximately 1 mole) of bisphenol A with 203 g (approximately 3.5 moles) of propylene oxide in the presence of 20 g of potassium methylate at 125° C. in an autoclave as described in German Offenlegungsschrift No. 31 23 059.

A mixture of 96 parts by weight of a conventional commercial aliphatic triisocyanate, having the approximate structure

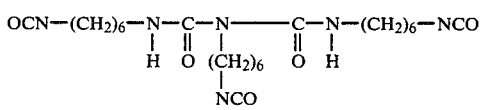

and an NCO content of 22 weight percent, and 2 parts by weight of γ-glycidylpropyltrimethoxysilane is used as polyisocyanate component.

The molar ratio of hydroxyl groups to isocyanate groups in the adhesive mixture is 1:1.

The combined tensile and shear strength and the floating roller peel strength are determined in accordance with DIN 53 455 and DIN 53 289, respectively. For this purpose, two 0.5 mm thick aluminum sheets of the Al Cu Mg 2 pl alloy which have been pretreated with chromic acid, are glued together. The following values are obtained: combined tensile and shear strength—2.8 [N/mm$^2$]—and floating roller peel strength—3.2 [N/mm].

(D) Comparative Test

In a comparative test, the sulfonated 1,3-polyetherdiol is replaced by an α,ω-polyetherdiol and an unsulfonated 1,3-polyetherdiol having a corresponding composition and molecular weight, as well as by two mixtures of sulfonated 1,3-polyetherdiol and α,ω-polyetherdiol. The adhesive obtained is tested in the manner described above. The results of this test are given in the following table.

TABLE

| Diol Component | Ratio of the Components α,ω-Polyetherdiol/ 1,3-Polyetherdiol | Combined Tensile and Shear Strength [N/mm$^2$] | Floating Roller Peel Strength [N/mm] |
|---|---|---|---|
| α,ω-Polyetherdiol | 100/0 | 1.8 | 1.3 |
| 1,3-Polyetherdiol | 0/100 | 1.1 | 0.6 |
| Sulfonated 1,3-polyetherdiol | 0/100 | 2.8 | 3.2 |
| Mixture of α,ω-polyetherdiol/ sulfonated 1,3-polyetherdiol | 66/34 | 1.9 | 2.0 |
|  | 34/66 | 2.0 | 1.9 |

The increase in bond strength due to the sulfonate group of the sulfonated 1,3-polyetherdiol is clear. The combined tensile and shear strength and the floating roller peel strength are increased by factors of about 2.5 and 5.3, respectively, relative to the adhesive, which had been prepared with the unsulfonated 1,3-polyetherdiol. Moreover, the increase in the floating roller peel strength in comparison to the adhesive based on the α,ω-polyether diol is surprising. If anything, the opposite result should have been expected here, because of the lower molecular weight of the main chain of the macromolecule.

We claim:

1. Compounds having the formula $$R^1CH_2O-(C_2H_4O-)_n(C_3H_6O-)_mCH_2CHR^3CH_2-SO_3X$$

in which
R$^1$ is

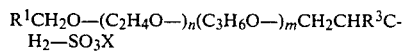

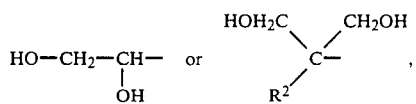

R$^2$ is CH$_3$—, C$_2$H$_5$—, or C$_3$H$_7$—,
R$^3$ is H— or CH$_3$—,
X is H—, alkali metal or ammonium ion,
n is 0 to 100,
m is 0 to 50, and
n+m is not less than 1.

* * * * *